United States Patent
Ikeda

(10) Patent No.: US 7,505,612 B2
(45) Date of Patent: Mar. 17, 2009

(54) IMAGE CONSTRUCTION METHOD, FINGERPRINT IMAGE CONSTRUCTION APPARATUS, AND PROGRAM

(75) Inventor: Munehiro Ikeda, Kawasaki (JP)

(73) Assignee: NEC Infrontia Corporation, Kawasaki-Shi (JP)

( * ) Notice: Subject to any disclaimer, the term of this patent is extended or adjusted under 35 U.S.C. 154(b) by 655 days.

(21) Appl. No.: 11/166,261

(22) Filed: Jun. 27, 2005

(65) Prior Publication Data

US 2007/0009141 A1   Jan. 11, 2007

(30) Foreign Application Priority Data

Jun. 30, 2004   (JP)   ............... 2004-193841

(51) Int. Cl.
*G06K 9/00* (2006.01)
*G06K 9/36* (2006.01)
(52) U.S. Cl. ...................................... 382/124; 382/284
(58) Field of Classification Search ................. 382/115, 382/124, 151, 190, 209, 218, 284, 291; 283/68
See application file for complete search history.

(56) References Cited

U.S. PATENT DOCUMENTS

| | | | | |
|---|---|---|---|---|
| 6,289,114 | B1* | 9/2001 | Mainguet | 382/124 |
| 7,043,061 | B2* | 5/2006 | Hamid et al. | 382/124 |
| 2002/0012455 | A1* | 1/2002 | Benckert | 382/124 |
| 2003/0026458 | A1* | 2/2003 | Nahum | 382/106 |

FOREIGN PATENT DOCUMENTS

| | | |
|---|---|---|
| JP | 2002-245457 | 8/2002 |
| JP | 2002-366950 | 12/2002 |
| JP | 2003-208620 | 7/2003 |
| JP | 2003-248820 | 9/2003 |
| JP | 2003-248828 | 9/2003 |
| JP | 2003-288160 | 10/2003 |

* cited by examiner

*Primary Examiner*—Daniel G Mariam
(74) *Attorney, Agent, or Firm*—Young & Thompson

(57) ABSTRACT

When slide operation of a finger on a sweep type fingerprint sensor is not constant, it is difficult to construct a general image of a fingerprint. An inspection region, which is used to find a difference between a latest partial image read by a sweep type fingerprint sensor and an already acquired partial image, is set in the already acquired partial image along a displacement direction of a plurality of consecutive already acquired partial images. A retrieval range for a position of superposition of the latest partial image on the already acquired partial image is set on the basis of a position of the inspection region. Displacement of the latest partial image with respect to the already acquired partial image is caused in the retrieval range and a difference between the already acquired partial image and the latest partial image concerning the inspection region is found every displacement. In addition, displacement of the latest partial image corresponding to a minimum difference quantity among the found difference quantities is determined as the position of superposition, and the latest partial image is disposed in the position of superposition with respect to the already acquired partial image and the latest partial image is stored.

9 Claims, 10 Drawing Sheets

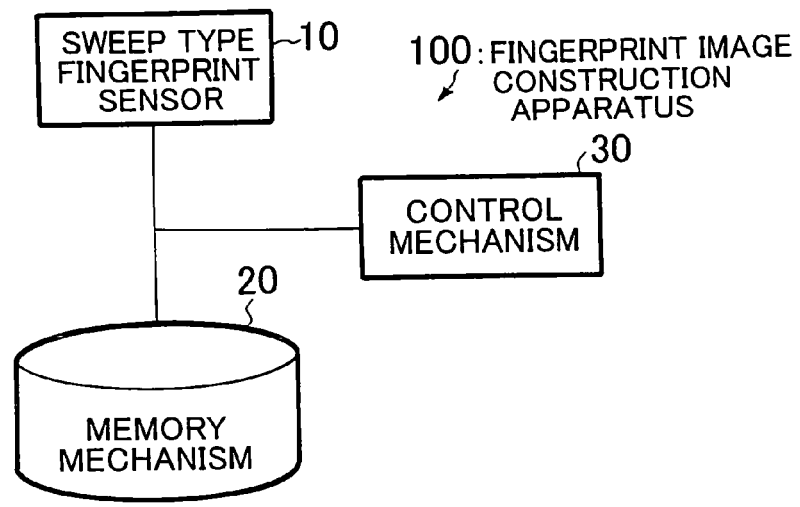
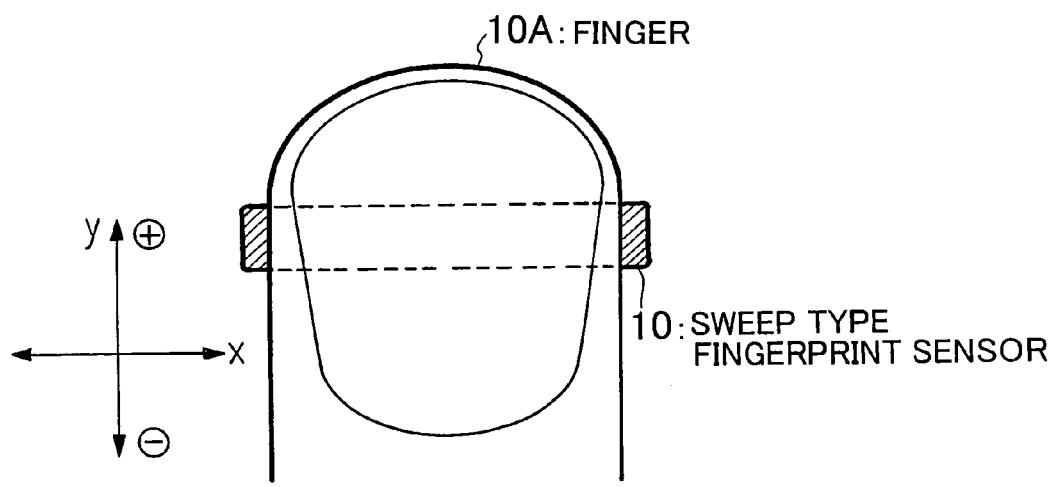

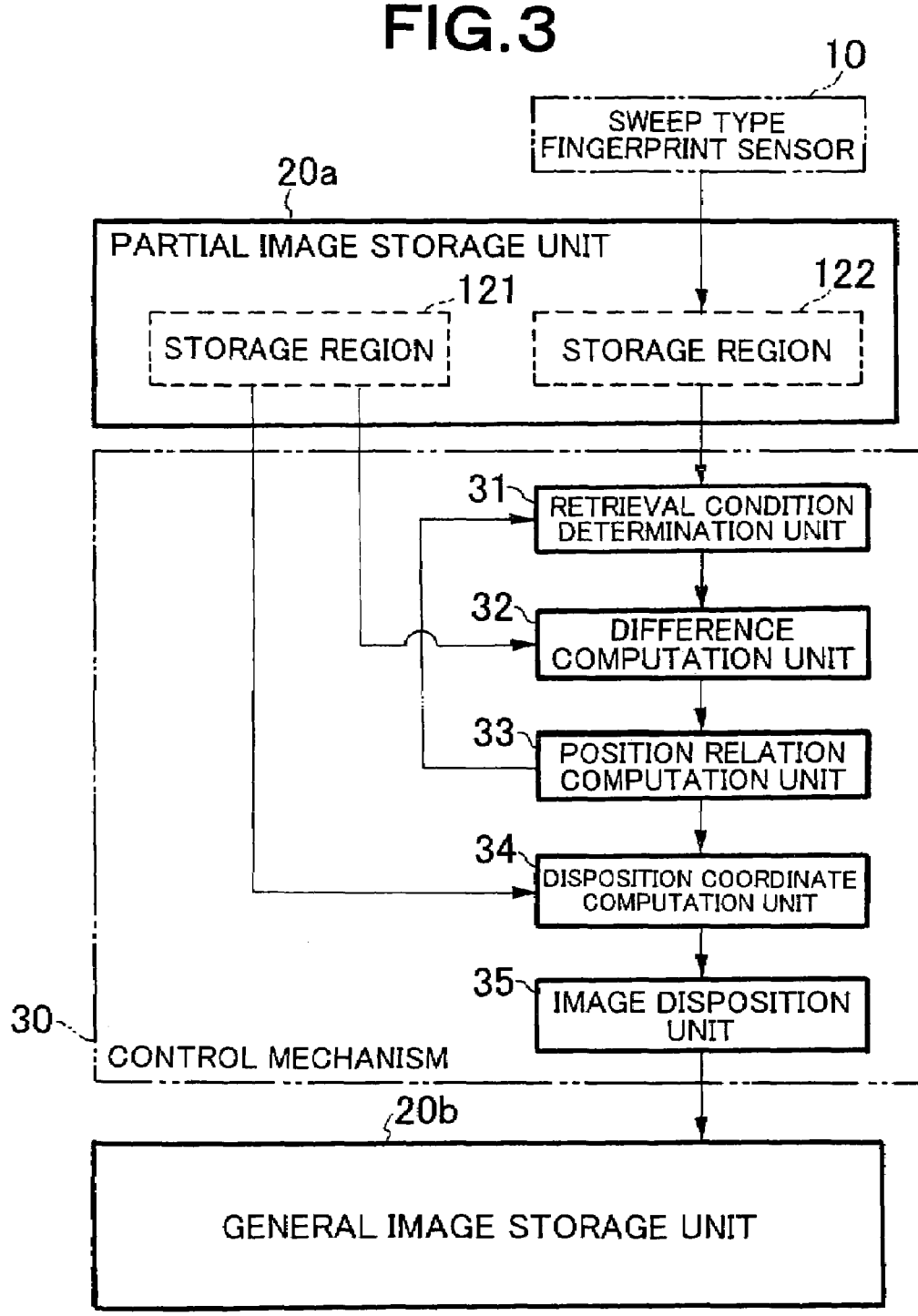

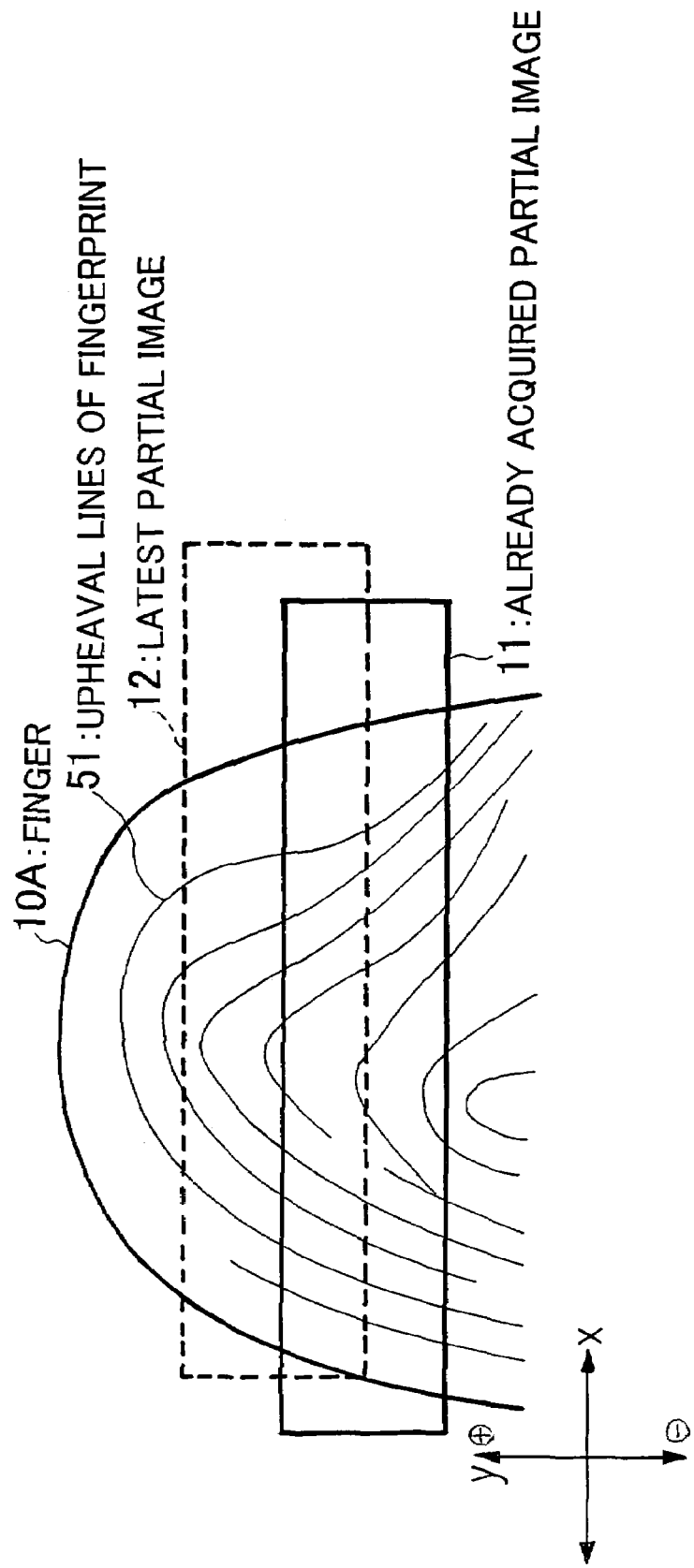

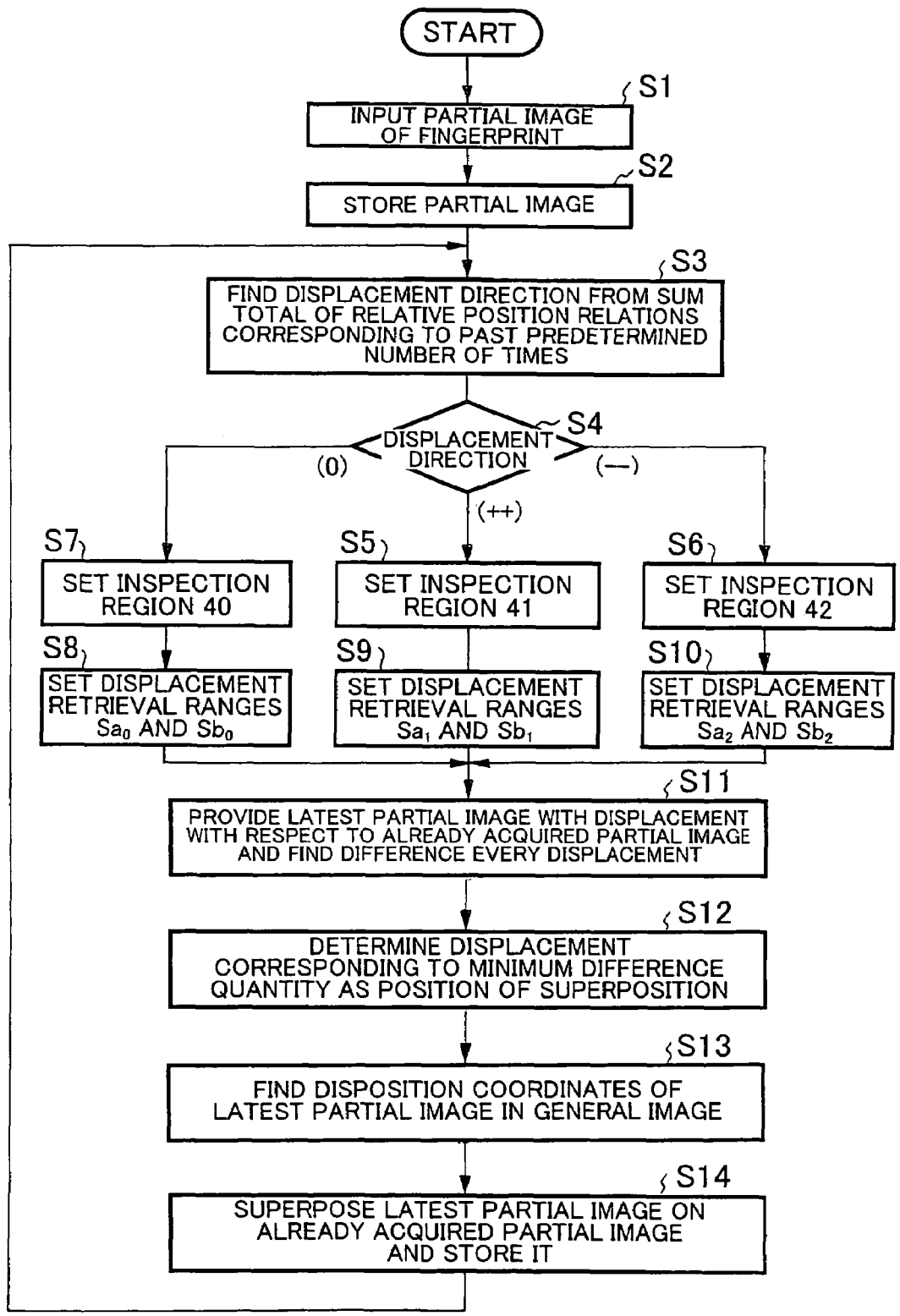

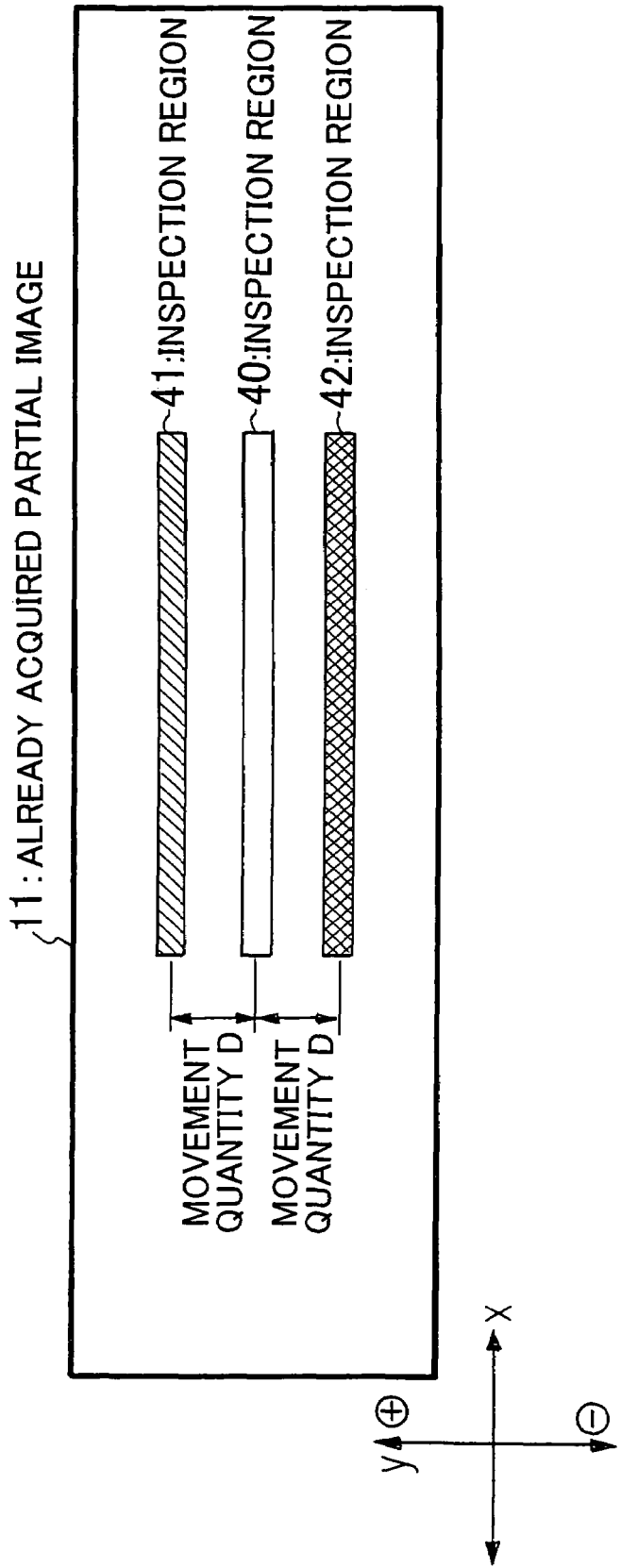

FIG.7

| READING ORDER | 1 | 2 | 3 | 4 | 5 | 6 | 7 | 8 | ... |
|---|---|---|---|---|---|---|---|---|---|
| RELATIVE POSITION RELATION | −2 | −1 | −1 | 0 | +2 | +3 | +3 | +2 | ... |
| SUM TOTAL (CORRESPONDING TO THREE PAST TIMES) | | | | −4 | −2 | +1 | +5 | +8 | +8 |
| DISPLACEMENT DIRECTION | | | | − − | − − | + + | + + | + + | + + |

IMAGE CONSTRUCTION METHOD, FINGERPRINT IMAGE CONSTRUCTION APPARATUS, AND PROGRAM

BACKGROUND OF THE INVENTION

1. Field of the Invention

The present invention relates to a technique of generating a fingerprint image to be used in fingerprint collation processing. In particular, the present invention relates to a technique of using a sensor mechanism to read a series of partial images representing a fingerprint from a finger which conducts slide operation and constructing a general image of the fingerprint from the series of partial images.

2. Description of the Related Art

As a kind of a conventional sensor mechanism to read a fingerprint image, there is the so-called sweep type fingerprint sensor. This sweep type fingerprint sensor has a sensor plane that is substantially the same in lateral width as a finger and that is shorter in longitudinal length than the whole fingerprint. The sweep type fingerprint sensor is a mechanism which continuously acquires partial images of a fingerprint from a finger which moves in substantially one direction. An image which can be acquired at each read timing of the sweep type fingerprint sensor has such a size as to be a part of the whole fingerprint. In order to acquire an image of the whole fingerprint, therefore, it is necessary to construct a general image joining a plurality of partial images successively read.

In constructing a general image from partial images of a fingerprint, there is, for example, a method of gradually shifting two consecutive partial images to overlap each other and determining a superposing position of both images on the basis of a difference between both images in the overlapping portion. In this method, a method of restricting a calculation subject of the difference to an inspection region which is a part of a partial image is adopted to fast calculate the difference between both images.

As a conventional method for determining an image region such as the inspection region, there is, for example, a method described in Japanese Patent Application Laid-Open No. 2003-208620. According to this method, a predetermined region in an input image, expected to overlap a preceding image is designated as a noted region, and a feature region corresponding to the inspection region is detected from the noted region. And a similar region that is the most similar to the feature region is detected from the preceding image, and the both images are combined so as to make the detected similar region and the feature region in the input image coincide with each other.

In the method described in Japanese Patent Application Laid-Open No. 2003-208620, however, the noted region, i.e., the region in the input image expected to overlap the preceding image is set in the same position for any input image. Only when the finger has slid in a predetermined one direction, therefore, it becomes possible to superpose the input image properly. For example, if the finger is slid in a direction opposite to the prescribed direction, therefore, a situation where the noted region in the input image does not correspond to the preceding image occurs and consequently the input image cannot be superposed on the preceding image. Furthermore, for example, when the finger does not slide smoothly on the sensor in one direction, a momentary motion of the finger substantially in the reverse direction is in fact caused. In such a case as well, however, a situation similar to the situation described above occurs. Therefore, it becomes difficult to construct a proper image of the whole fingerprint.

SUMMARY OF THE INVENTION

The present invention has been achieved to solve the problems. An object of the present invention is to provide an image construction method which is less susceptible to an influence of the slide direction of the finger in constructing the image of the whole fingerprint.

An image construction method according to the present invention is a method, in which an apparatus equipped with a sensor mechanism to read a series of partial images representing a fingerprint from a finger which conducts a slide operation, successively stores partial images read by the sensor mechanism, sets an inspection region, which is used to find a difference quantity between a latest partial image and an already acquired partial image in the successively stored partial images, in the already acquired partial image along a displacement direction of a plurality of consecutive already acquired partial images, sets a retrieval range for a position of superposition of the latest partial image on the already acquired partial image on the basis of a position of the inspection region, causes displacement of the latest partial image with respect to the already acquired partial image in the retrieval range and finds a difference quantity between the already acquired partial image and the latest partial image concerning the inspection region every displacement, determines displacement of the latest partial image corresponding to a minimum difference quantity among the found difference quantities as the position of superposition, and disposes the latest partial image in the position of superposition with respect to the already acquired partial image and stores the latest partial image.

A fingerprint image construction apparatus according to the present invention includes a sensor mechanism which reads a series of partial images representing a fingerprint from a finger which conducts a slide operation, a memory mechanism which successively stores the series of partial images read by the sensor mechanism, and a control mechanism which conducts on the series of partial images stored by the memory mechanism, and the control mechanism includes a retrieval condition determination unit which sets an inspection region, which is used to find a difference quantity between a latest partial image and an already acquired partial image in the partial images successively stored by the memory mechanism, in the already acquired partial image along a displacement direction of a plurality of consecutive already acquired partial images, and sets a retrieval range for a position of superposition of the latest partial image on the already acquired partial image on the basis of a position of the inspection region; a difference quantity computation unit which causes displacement of the latest partial image with respect to the already acquired partial image in the retrieval range, and finds a difference quantity between the already acquired partial image and the latest partial image concerning the inspection region every displacement; a position relation computation unit which determines displacement of the latest partial image corresponding to a minimum difference quantity among the found difference quantities as the position of superposition; and an image disposition unit which disposes the latest partial image in the position of superposition with respect to the already acquired partial image in the memory mechanism.

A program according to the present invention causes a computer connected to a sensor mechanism to read a series of partial images representing a fingerprint from a finger which conducts a slide operation to execute successively storing partial images read by the sensor mechanism, setting an inspection region, which is used to find a difference quantity between a latest partial image and an already acquired partial image in the successively stored partial images, in the already acquired partial image along a displacement direction of a plurality of consecutive already acquired partial images, setting a retrieval range for a position of superposition of the latest partial image on the already acquired partial image on the basis of a position of the inspection region, causing displacement of the latest partial image with respect to the already acquired partial image in the retrieval range and finding a difference quantity between the already acquired partial image and the latest partial image concerning the inspection region every displacement, determining displacement of the latest partial image corresponding to a minimum difference quantity among the found difference quantities as the position of superposition, and disposing the latest partial image in the position of superposition with respect to the already acquired partial image and storing the latest partial image.

According to the present invention, the inspection region used to find the difference between the already acquired partial image and the latest partial image is set along the displacement direction of a plurality of already acquired partial images in the construction processing of the general image of a fingerprint. Therefore, there is a merit that the slide direction of the finger with respect to the sensor mechanism is not susceptible to a restriction. In addition, even if there is a variation such as a local increase in the movement speed of the finger, it can be coped with the variation more easily, resulting in an effect.

BRIEF DESCRIPTION OF THE DRAWINGS

FIG. 1 is a block diagram showing a configuration of a fingerprint image construction apparatus according to an embodiment of the present invention;

FIG. 2 is a explanatory diagram showing a sweep type fingerprint sensor according to an embodiment;

FIG. 3 is a block diagram showing a functional configuration of a fingerprint image construction apparatus according to an embodiment;

FIG. 4 is a explanatory diagram showing partial images according to an embodiment;

FIG. 5 is a flow chart showing an operation procedure according to an embodiment;

FIG. 6 is a explanatory diagram showing a position of an inspection region according to an embodiment;

FIG. 7 is a explanatory diagram showing a method used to determine an inspection region according to an embodiment;

DESCRIPTION OF THE PREFERRED EMBODIMENTS

Figure 8:
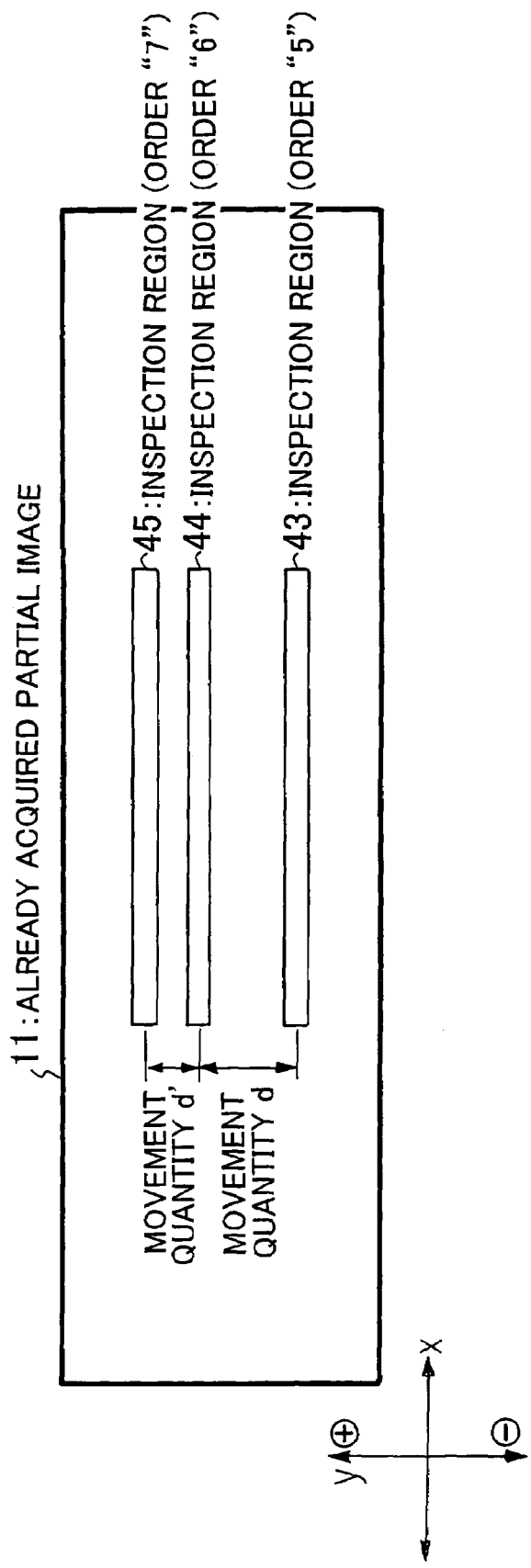
FIG. 8 is a explanatory diagram showing another method used to determine an inspection region according to an embodiment.

Hereafter, embodiments of the present invention will be described in detail with reference to the drawings. FIG. 1 is a block diagram showing a configuration of a fingerprint image construction apparatus according to an embodiment of the present invention. A sweep type fingerprint image construction apparatus 100 according to an embodiment includes a sweep type fingerprint sensor 10 serving as a sensor mechanism which reads a series of partial images representing a fingerprint, a memory mechanism 20 which stores partial images read by the sensor 10, a control mechanism 30 which conducts construction processing to construct a general image from a series of partial images stored by the memory mechanism 20.

A general view of the sweep type fingerprint sensor 10 is shown in FIG. 2. The sweep type fingerprint sensor 10 has a sensor surface that is substantially the same in width in an illustrated x direction as the finger 10A and that is shorter in length in a y direction than the length of the whole fingerprint of the finger 10A, i.e., the length between the first joint and a fingertip. From the finger 10A which slides on this surface substantially in the y direction, partial images of the fingerprint are read consecutively.

FIG. 3 shows functional configuration blocks of the fingerprint image construction apparatus 100. A partial image storage unit 20a and a general image storage unit 20b shown in FIG. 3 are storage regions assigned to the memory mechanism 20 respectively. The partial image storage unit 20a stores partial images successively input from the sweep type fingerprint sensor 10. The general image storage unit 20b stores a general image of the fingerprint formed via construction processing conducted in the control mechanism 30 described later.

The partial image storage unit 20a has such a capacity as to be able to store a plurality of partial images. In the illustrated example, the partial image storage unit 20a includes a storage region 121 and a storage region 122 to store two partial images. The latest partial image input from the sweep type fingerprint sensor 10 is stored in the storage region 122. An already partial image corresponding to a preceding image for the latest partial image, i.e., the second latest partial image at the current time point is stored in the storage region 121.

An example of partial images stored in the storage region 121 and the storage region 122 is shown in FIG. 4. Curves shown in the illustrated finger 10A represent upheaval lines 51 of the fingerprint. At each read timing of the sweep type fingerprint sensor 10, one of rectangular partial images indicated by a solid line or a dotted line is input to the memory mechanism 20. In the example shown in FIG. 4, the rectangle indicated by a solid line represents an already acquired partial image 11 stored in the storage region 121. A latest partial image 12 read in the wake of the already acquired partial image 11 and stored in the storage region 122 is indicated by a dotted line rectangle.

In FIG. 4, a position shift between the already acquired partial image 11 and the latest partial image 12 represents that a relative position of the finger 10A with respect to the sweep type fingerprint sensor 10 is shifted every input. The position relation between the images 11 and 12 indicates that the finger 10A shown in FIG. 2 has slid in a minus (−) direction of the y axis with respect to the sweep type fingerprint sensor 10.

The functional configuration of the control mechanism 30 shown in FIG. 3 takes charges of construction processing of superposing the latest partial image stored in the storage region 122 on the already acquired partial image stored in the storage region 121. A retrieval condition determination unit 31 stores information concerning the relative position supplied from a position relation computation unit 33 described later, and determines a position of an inspection region to be used for the construction processing of the latest partial image and a retrieval range of displacement corresponding to this inspection region on the basis of the immediate past displacement direction of partial images.

A difference computation unit 32 calculates the difference between a partial image serving as reference, i.e., the already acquired partial image stored in the storage region 121 and the latest partial image stored in the storage region 122 which is a partial image to be subject to processing, on the basis of the inspection region and the displacement retrieval range output from the retrieval condition determination unit 31, and outputs a combination of the displacement and the difference of the result of calculation.

The position relation computation unit 33 determines a position of superposition of the latest partial image on the already acquired partial image on the basis of the combination of the displacement and the difference output from the difference computation unit 32. In this determination, a relative position relation of the latest partial image to the already acquired partial image is found. The above-described information concerning the relative position stored by the retrieval condition determination unit 31 is the position information of the superposition determined by the position relation computation unit 33.

A disposition coordinate computation unit 34 calculates disposition coordinates that should be taken in the general image storage unit 20b by the latest partial image stored in the partial image storage unit 20a on the basis of the relative position relation calculated by the position relation computation unit 33 and the disposition coordinates of the partial image disposed the last time. The calculated disposition coordinates are stored inside in preparation for computation to be conducted next time. An image disposition unit 35 disposes the latest partial image in the general image storage unit 20b in accordance with the result of calculation conducted by the disposition coordinate computation unit 34.

An operation procedure in the fingerprint image construction apparatus 100 will now be described with reference to a flow chart shown in FIG. 4. The finger 10A is slid with respect to the sweep type fingerprint sensor 10. Each time a partial image is input (step S1), the memory mechanism 20 stores the latest partial image 12 as shown in FIG. 4 in the storage region 122 (step S2). At this time, the already acquired partial image 11 which is the preceding image for the latest partial image 12 is stored in the other storage region 121. Hereafter, a procedure of superposing the latest partial image 12 on the already acquired partial image 11 shown in FIG. 4 will be described as an example of the construction processing conducted by the control mechanism 30.

The retrieval condition determination unit 31 sets the inspection region and the displacement retrieval range to be used for the latest partial image 12 to be subject to construction processing this time. The term "inspection region" means a region that becomes the subject of calculation of the difference between the latest partial image 12 and the already acquired partial image 11. This inspection region is set with respect to the already acquired partial image 11. The term "displacement retrieval range" means a range, in the y axis direction, of the displacement of the latest partial image 12 on the already acquired partial image 11 given to determine the position of superposition of the latest partial image 12 on the already acquired partial image 11.

First, a method of determining the inspection region will now be described with reference to FIGS. 6 and 7. FIG. 6 shows three inspection regions 40, 41 and 42 collectively on the already acquired partial image 11 for description. The inspection region 40 is located on a central part of the already acquired partial image 11 on the y axis. The inspection region 41 is located in a position at a distance of a predetermined movement quantity D from the central part along a plus (+) direction of the y axis. The inspection region 42 is located in a position at a distance of the same movement quantity D from the central part along a minus (−) direction of the y axis. The retrieval condition determination unit 31 finds the sum total of displacement quantities of partial images corresponding to several times read in the past, and judges the immediate past displacement direction of the partial images on the basis of the sign of the found sum total (step S3 in FIG. 5). And the retrieval condition determination unit 31 selects one from the three inspection regions shown in FIG. 6 according to the judged displacement direction (step S4).

Selection of the inspection region will now be described concretely with reference to FIG. 7. It is now supposed that information concerning the relative position relations among partial images successively read by the sweep type fingerprint sensor 10 are recorded in a list as shown in FIG. 7. In the illustrated list, "reading order" of the sweep type fingerprint sensor 10, "relative position relation" representing displacement quantities between partial images calculated by the position relation computation unit 33 described later, "sum total" of "relative position relations" corresponding to several past times from the current time point, and "displacement direction" based on the sign of the "sum total" are shown. In the illustrated example, a moving sum of three last times is recorded as the "sum total" at the current time point. For example, the sum total "−4" associated with the reading order "4" is equal to the sum total of relative position relations "−2", "−1" and "−1" respectively associated with the immediate past reading orders "1" to "3".

If the sign of the sum total of the relative position relations, i.e., the record of "displacement direction" shown in FIG. 7 is positive (++), the retrieval position determination unit 31 adopts the inspection region 41 located in the plus direction of the y axis from the central part of the already acquired partial image 11 in FIG. 6 (step S5 in FIG. 5). If the "displacement direction" is negative (−−), the retrieval position determination unit 31 adopts the inspection region 42 located in the minus direction of the y axis (step S6). If the sum total is zero although not illustrated in the list shown in FIG. 7, the retrieval position determination unit 31 adopts the inspection region 40 located in the central part of the already acquired partial image 11 shown in FIG. 6 (step S7).

In the above described method, the movement quantity D shown in FIG. 6 is a fixed value. Alternatively, the movement quantity D may be made variable by using a method of setting the movement quantity D on the basis of, for example, the past variation level in the "relative position relation." Specifically, when the reading order at the current time point in the record shown in FIG. 7 is "7," a movement difference of relative position relations associated with past reading order "4" to "6" is noted. As appreciated from FIG. 7, a difference in relative position relation between "4" and "5" is "2." A difference between subsequent "5" and "6" is "1." In transition from the reading order "4" to "6," therefore, the retrieval condition determination unit 31 judges that the variation level in the relative position relation tends to become small.

Under the judgment, a position of an inspection region in the reading order "7" at the current time point is fixed on a position at a distance of a movement quantity d' which is smaller than a movement quantity d adopted for the order "6," from a position of an inspection region set for the reading order "6" the last time. This will now be described further with reference to FIG. 8. An inspection region 45 for the reading order "7" at the current time point is set at a distance of the movement quantity d' from an inspection region 44 set for the reading order "6" the last time along the plus direction. This movement quantity d' becomes smaller than the movement quantity d from the inspection region 43 set for the reading order "5" at the time before the last time. When the variation level in relative position relation tends to become larger, a quantity that is larger than the movement quantity set the last time is set as a movement quantity this time. According to the method described above, a displacement retrieval range with due regard to the variation level in relative position relation formed by immediate past partial images can be set.

Figure 9:
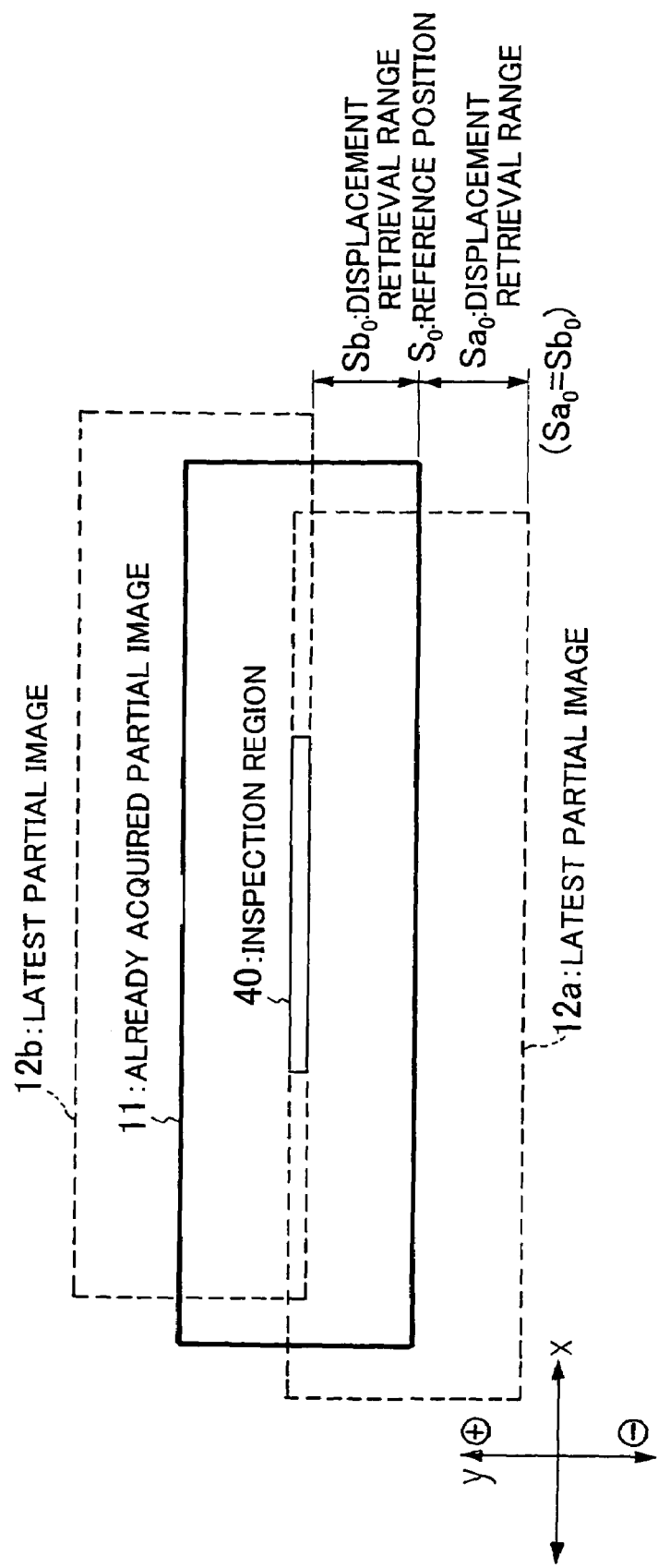
FIG. 9 is a explanatory diagram showing a displacement retrieval range according to an embodiment.

Subsequently, the retrieval condition determination unit 31 sets a displacement retrieval range to retrieve a position of superposition of the latest partial image 12 on the already acquired partial image 11 on the basis of the position of the inspection region determined according to the procedure described above. FIG. 9 shows displacement retrieval ranges $Sa_0$ and $Sb_0$ for the inspection region 40 shown in FIG. 6. As shown in FIG. 9, the displacement retrieval ranges $Sa_0$ and $Sb_0$ are ranges where the inspection region 40 in the already acquired partial image 11 overlap the latest partial image 12 which displaces on the already acquired partial image 11.

A principle of setting the displacement retrieval range will now be described with reference to FIG. 9. The latest partial image 12 is gradually displaced on the already acquired partial image 11 in a plus or minus direction along the y axis from an illustrated reference position $S_0$. For superposing the inspection region 40 in the already acquired partial image 11 on the latest partial image 12, the position of the latest partial image 12a represented by a dotted line in FIG. 9 is a limit in displacement in the minus direction. In displacement in the plus direction, the position of the latest partial image 12b shown in FIG. 9 becomes a limit. The retrieval condition determination unit 31 sets the ranges on the y axis obtained from the positions of these limits and the reference position $S_0$ as the displacement retrieval ranges $Sa_0$ and $Sb_0$ respectively (step S8 in FIG. 5). In the example shown in FIG. 9, the inspection region 40 is in a central part of the already acquired partial image 11. Therefore, the displacement retrieval range $Sa_0$ in the minus direction and the displacement retrieval range $Sb_0$ in the plus direction have the same quantity ($Sa_0=Sb_0$).

Figure 10:
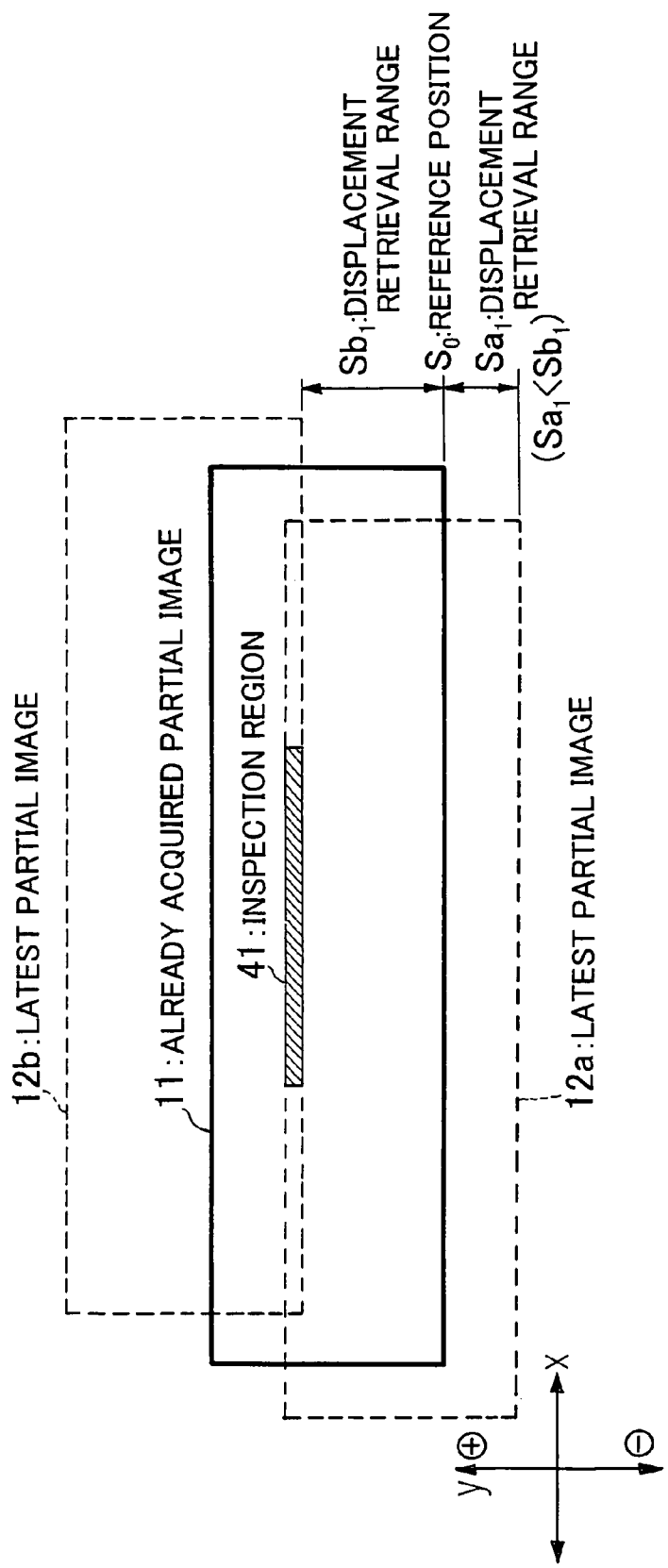
FIG. 10 is a explanatory diagram showing a displacement retrieval range according to an embodiment.

If the inspection region 41 is already set in the already acquired partial image 11, the retrieval condition determination unit 31 sets displacement retrieval ranges $Sa_1$ and $Sb_1$ shown in FIG. 10 (step S9 in FIG. 5). If the inspection region 42 is already set in the already acquired partial image 11, the retrieval condition determination unit 31 sets displacement retrieval ranges $Sa_2$ and $Sb_2$ shown in FIG. 11 (step S10 in FIG. 5).

In the case of the inspection region 41, the inspection region 41 is disposed at a distance from the central part of the already acquired partial image 11 along the plus direction of the y axis. Therefore, a displacement retrieval range $Sb_1$ in the plus direction is larger than a displacement retrieval range $Sa_1$ in the minus direction ($Sa_1<Sb_1$). In other words, when the relative position relation among partial images successively read tends to conduct transition in the plus direction of the y axis, the retrieval range in the plus direction is set to be larger than the retrieval range in the minus direction. This is advantageous in the retrieval in the plus direction when the difference computation unit 32 retrieves the position of superposition of the latest partial image 12 on the already acquired partial image 11 later.

Relations between the replacement retrieval ranges $Sa_1$ and $Sb_1$ for the inspection region 41 shown in FIG. 10 and the replacement retrieval ranges $Sa_0$ and $Sb_0$ for the inspection region 40 set in the central part of the already acquired partial image 11 as shown in FIG. 9 can be represented as "$Sa_1=Sa_0-D$" and "$Sb_1=Sb_0+D$." The latter "$Sb_1=Sb_0+D$" means that the displacement retrieval range in the y axis plus direction is expanded by the movement quantity "D" when the inspection region 41 is adopted as compared with when the inspection region 40 is adopted. Even if a large transition of the latest partial image 12 in the plus direction occurs with respect to the already acquired partial image 11, i.e., the finger slide becomes rapidly fast, it is facilitated to cope with the variation in the plus direction by adopting the inspection region 41.

Figure 11:
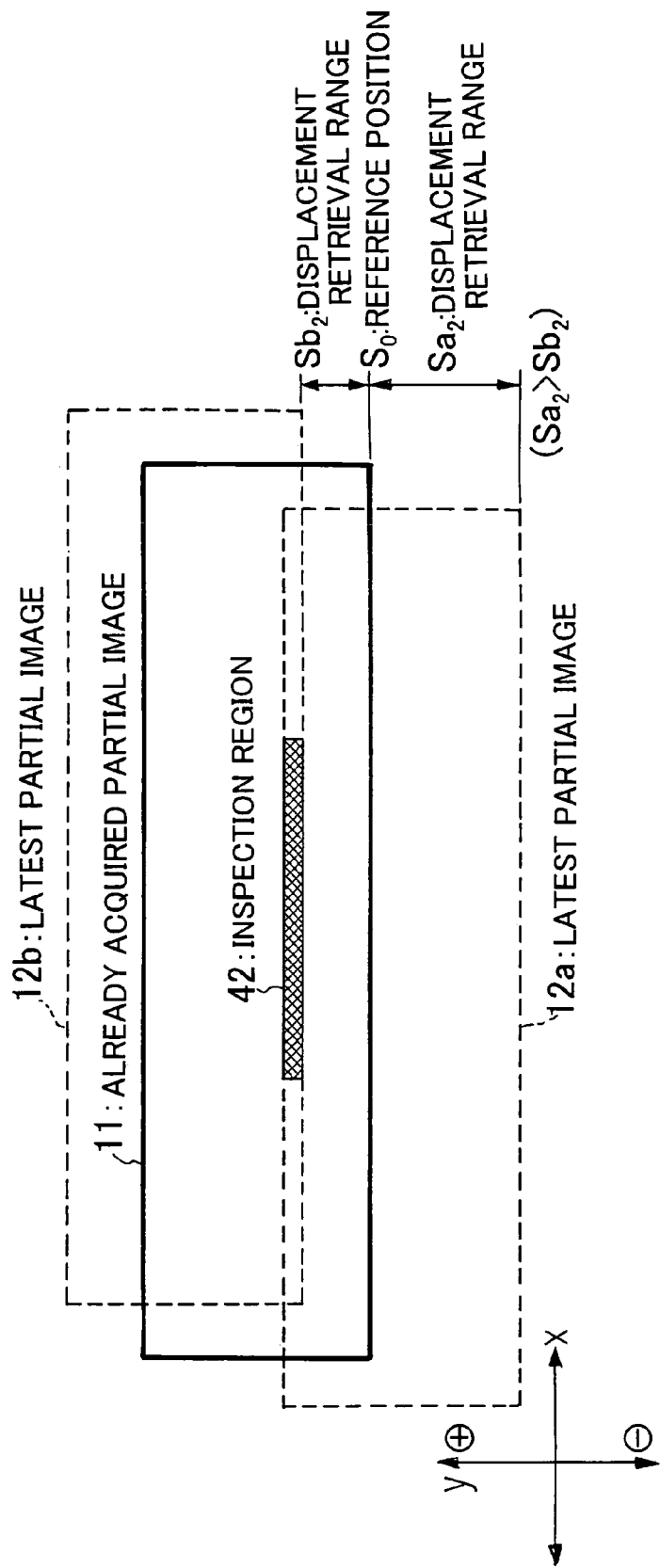
FIG. 11 is a explanatory diagram showing a displacement retrieval range according to an embodiment.

Conversely, as for the inspection region 42 set when the relative position relation of the partial image tends to conduct transition in the minus direction of the y axis, the displacement retrieval range $Sa_2$ in the minus direction becomes larger than the displacement retrieval range $Sb_2$ in the plus direction as shown in FIG. 11 ($Sa_2>Sb_2$). This is advantageous in the retrieval in the minus direction when the difference computation unit 32 retrieves the position of superposition later.

Since the movement speed of the finger continuously changes, there is strong correlation between the relative position relation found between partial images calculated in the immediate past and the relative position relation to be currently calculated. The retrieval condition determination method heretofore described is based on this fact.

By the way, in the early period of the fingerprint image construction processing, the quantity of read partial images is small and consequently it is difficult to judge the immediate past displacement direction of already acquired partial images. In the early period of the processing, therefore, the retrieval condition shown in FIG. 9 in which the inspection region is disposed in the central part of the already acquired partial image 11 may be fixedly adopted until reading corresponding to a quantity required to judge the displacement direction, such as reading corresponding to three times since reading start, is finished. This is based on an idea that it should be facilitated to cope with displacement in either of the plus direction and the minus direction for the time being in the early period in which the displacement direction is not clear.

When the retrieval condition determination unit 31 determines the inspection region and the displacement retrieval range, effects of the present invention are obtained sufficiently by conducting the determination only for the y direction in the above-described method considering that the finger moves substantially in the y direction. However, it is also possible to conduct determination in the x direction as well by using a similar method.

The retrieval condition determination unit 31 outputs the position of the inspection region and the displacement retrieval range determined by using the method described heretofore to the difference computation unit 32 as the retrieval condition at this time, and stores this retrieval condition inside in preparation for processing conducted next time.

The difference computation unit 32 calculates a difference quantity between the already acquired partial image 11 serving as the reference stored in the storage region 121 and the latest partial image 12 serving as the processing subject stored in the storage region 122 in accordance with the retrieval condition obtained from the retrieval condition determination unit 31. In calculating the difference quantity, the difference computation unit 32 displaces the already acquired partial image 11 and the latest partial image 12 in the displacement retrieval range output from the retrieval condition determination unit 31. In other words, the difference computation unit 32 gradually shifts the already acquired partial image 11 and the latest partial image 12 and superpose the latest partial image 12 on the already acquired partial image 11. At each time of superposition, the difference computation unit 32 successively finds difference quantities between gray level data at pixels existing in the inspection region in the already acquired partial image 11 and gray level data at pixels existing in the corresponding region in the latest partial image 12, and finds the sum total of the difference quantities found for all pixels. A difference quantity obtained by this sum total is a difference quantity found at each time of superposition.

The difference computation unit 32 combines the difference quantity obtained at the time of each superposition with the displacement of the latest partial image 12 at that time point, and outputs a result to the position relation computation unit 33 (step S11 in FIG. 5). Besides the sum total of differences for gray level data of pixels described above, sum total of difference squares may also be used as the difference quantity. Or it is also possible to use a method of finding a difference quantity by converting vector distribution of upheaval lines of the fingerprint in both partial images or feature points of the fingerprint, such as end points and branch points of fingerprint upheaval lines, into numerical values and comparing the numerical values between partial images.

The position relation computation unit 33 determines the position of superposition of the latest partial image 12 on the already acquired partial image 11, i.e., the position of superposition of the latest partial image 12 on the already acquired partial image 11 in a mutually overlapping place, on the basis of combination of the difference quantity and displacement output from the difference computation unit 32. At that time, the position relation computation unit 33 pays attention to the minimum difference quantity among the above-described difference quantities obtained from the difference computation unit 32, and determines the displacement corresponding to the minimum difference quantity as the position of superposition (step S12 in FIG. 5). The position of superposition of the latest partial image 12 found here becomes the value of "relative position relation" described with reference to, for example, FIG. 7. The position relation computation unit 33 outputs the determined relative position relation to the retrieval condition determination unit 31 and the disposition coordinate computation unit 34.

The disposition coordinate computation unit 34 calculates the disposition coordinates of the origin of the latest partial image 12 to be disposed in the general image, on the basis of coordinates of the origin of the already acquired partial image 11 serving as the reference in the general image and the relative position relation obtained from the position relation computation unit 33. The coordinate values of the origin of the already acquired partial image 11 have been stored in computation conducted last time. The origin of a partial image means reference coordinates set in common to all partial images read by the sweep type fingerprint sensor 10. For example, specific vertex coordinates or the like in a rectangle formed by a partial image are adopted as the origin. The disposition coordinate computation unit 34 outputs the coordinate values of the origin of the latest partial image 12 in the general image to the image disposition unit 35, and stores the coordinate values in the disposition coordinate computation unit 34 in preparation for the computation conducted next time (step S13 in FIG. 5).

Finally, the image disposition unit 35 disposes the latest partial image 12 so as to superpose it on the already acquired partial image 11 in the general image storage unit 20b, on the basis of the coordinate values output by the disposition coordinate computation unit 34 (step S14). As a result, the latest partial image 12 is disposed on the already acquired partial image 11 as shown in, for example, FIG. 4. The processing heretofore described is repeated until reading of the fingerprint conducted by the sweep type fingerprint sensor 10 is finished.

According to the fingerprint image construction apparatus 100 in the embodiment heretofore described, the inspection region used to find the difference between both images is set along the displacement direction of a plurality of already acquired partial images when superposing the latest partial image 12 on the already acquired partial image 11 in the construction processing of the fingerprint image. Therefore, restriction on the slide direction of the finger with respect to the sweep type fingerprint sensor 10 can be relaxed. As a result, convenience in use of the sweep type fingerprint sensor 10 is improved.

The above-described operation procedure of the control mechanism 30 corresponds to a process of a program executed by a computer. Therefore, a device can be used as the fingerprint image construction apparatus 100 by introducing the program corresponding to the procedure into an information processing device, such as a personal computer or a personal digital assistant, having the sweep type fingerprint sensor 10.

What is claimed is:

1. An image construction method, in which an apparatus equipped with a sensor mechanism to read a series of partial images representing a fingerprint from a finger which conducts a slide operation successively stores partial images read by the sensor mechanism, sets an inspection region, which is used to find a difference quantity between a latest partial image and an already acquired partial image in the successively stored partial images, in the already acquired partial image along a displacement direction of a plurality of consecutive already acquired partial images, sets a retrieval range for a position of superposition of the latest partial image on the already acquired partial image on the basis of a position of the inspection region, causes displacement of the latest partial image with respect to the already acquired partial image in the retrieval range and finds a difference quantity between the already acquired partial image and the latest partial image concerning the inspection region every displacement, determines displacement of the latest partial image corresponding to a minimum difference quantity among the found difference quantities as the position of superposition, and disposes the latest partial image in the position of superposition with respect to the already acquired partial image and stores the latest partial image.

2. The image construction method according to claim 1, wherein when setting the inspection region, the apparatus finds the displacement direction on the basis of a sign of sum total of displacement quantities of the plurality of already acquired partial images, and sets the inspection region in a position at a predetermined distance from a central part of the already acquired partial image along the displacement direction.

3. The image construction method according to claim 1, wherein when setting the inspection region, the apparatus finds the displacement direction on the basis of a sign of sum total of displacement quantities of the plurality of already acquired partial images, determines a movement quantity from the position of the inspection region set last time on the basis of a variation level among the displace quantities, and sets the inspection region in a position at a distance equivalent to the movement quantity from the position set last time along the displacement direction.

4. A fingerprint image construction apparatus including a sensor mechanism which reads a series of partial images representing a fingerprint from a finger which conducts a slide operation, a memory mechanism which successively stores the series of partial images read by the sensor mechanism, and a control mechanism which conducts on the series of partial images stored by the memory mechanism, wherein the control mechanism comprises:

a retrieval condition determination unit which sets an inspection region, which is used to find a difference quantity between a latest partial image and an already acquired partial image in the partial images successively stored by the memory mechanism, in the already acquired partial image along a displacement direction of a plurality of consecutive already acquired partial images, and sets a retrieval range for a position of superposition of the latest partial image on the already acquired partial image on the basis of a position of the inspection region;

a difference quantity computation unit which causes displacement of the latest partial image with respect to the already acquired partial image in the retrieval range, and finds a difference quantity between the already acquired partial image and the latest partial image concerning the inspection region every displacement;

a position relation computation unit which determines displacement of the latest partial image corresponding to a minimum difference quantity among the found difference quantities as the position of superposition; and an image disposition unit which disposes the latest partial image in the position of superposition with respect to the already acquired partial image in the memory mechanism.

5. The image construction apparatus according to claim 4, wherein when setting the inspection region, the retrieval condition determination unit finds the displacement direction on the basis of a sign of sum total of displacement quantities of the plurality of already acquired partial images, and sets the inspection region in a position at a predetermined distance from a central part of the already acquired partial image along the displacement direction.

6. The image construction apparatus according to claim 4, wherein when setting the inspection region, the retrieval condition determination unit finds the displacement direction on the basis of a sign of sum total of displacement quantities of the plurality of already acquired partial images, determines a movement quantity from the position of the inspection region set last time on the basis of a variation level among the displace quantities, and sets the inspection region in a position at a distance equivalent to the movement quantity from the position set last time along the displacement direction.

7. A computer program stored on a computer readable storage medium that when executed causes a computer connected to a sensor mechanism to read a series of partial images representing a fingerprint from a finger which conducts a slide operation, the computer program causing the computer to execute the steps of:

successively storing partial images read by the sensor mechanism, setting an inspection region, which is used to find a difference quantity between a latest partial image and an already acquired partial image in the successively stored partial images, in the already acquired partial image along a displacement direction of a plurality of consecutive already acquired partial images, setting a retrieval range for a position of superposition of the latest partial image on the already acquired partial image on the basis of a position of the inspection region, causing displacement of the latest partial image with respect to the already acquired partial image in the retrieval range and finding a difference quantity between the already acquired partial image and the latest partial image concerning the inspection region every displacement, determining displacement of the latest partial image corresponding to a minimum difference quantity among the found difference quantities as the position of superposition, and disposing the latest partial image in the position of superposition with respect to the already acquired partial image and storing the latest partial image.

8. The computer program according to claim 7, wherein when setting the inspection region, the program causes the computer to execute finding the displacement direction on the basis of a sign of sum total of displacement quantities of the plurality of already acquired partial images, and setting the inspection region in a position at a predetermined distance from a central part of the already acquired partial image along the displacement direction.

9. The computer program according to claim 7, wherein when setting the inspection region, the program causes the computer to execute finding the displacement direction on the basis of a sign of sum total of displacement quantities of the plurality of already acquired partial images, determining a movement quantity from the position of the inspection region set last time on the basis of a variation level among the displace quantities, and setting the inspection region in a position at a distance equivalent to the movement quantity from the position set last time along the displacement direction.

* * * * *